United States Patent [19]

Kelch

[11] Patent Number: 4,680,234
[45] Date of Patent: Jul. 14, 1987

[54] WEATHERABLE COEXTRUDED FLEXIBLE FILMS AND LAMINATED STRUCTURE

[75] Inventor: Robert H. Kelch, Granville, Ohio

[73] Assignee: The Dow Chemical Company, Midland, Mich.

[21] Appl. No.: 732,981

[22] Filed: May 13, 1985

[51] Int. Cl.$^4$ .................. B32B 15/08; B32B 27/00
[52] U.S. Cl. .................................. 428/461; 428/463; 428/518; 428/520; 428/908.8; 428/328; 428/324; 428/325; 428/512; 428/514; 264/176.1; 156/244.24
[58] Field of Search ............... 428/461, 463, 518, 520

[56] References Cited

U.S. PATENT DOCUMENTS

| | | | |
|---|---|---|---|
| 3,006,889 | 10/1961 | Frey | 260/45.5 |
| 3,165,560 | 1/1965 | Frey et al. | 428/474 |
| 3,291,863 | 12/1966 | Frey et al. | 260/897 |
| 3,299,182 | 1/1967 | Jennings et al. | 260/897 |
| 3,579,416 | 5/1971 | Schrenk | 428/518 |
| 3,705,067 | 12/1972 | Ammons | 156/324 |
| 3,819,554 | 6/1974 | Blanchard | 260/28.5 D |
| 3,845,166 | 10/1974 | Betts et al. | 428/379 |
| 3,904,579 | 9/1975 | Braddicks | 260/42.46 |
| 3,940,456 | 2/1976 | Frey et al. | 260/897 C |
| 3,994,995 | 11/1976 | Frey et al. | 260/897 C |
| 4,113,805 | 9/1978 | Frey et al. | 260/897 C |
| 4,376,799 | 3/1983 | Tusim | 428/518 |

*Primary Examiner*—P. C. Ives
*Attorney, Agent, or Firm*—Douglas N. Deline

[57] ABSTRACT

A flexible weather resistant film comprising a weather resistant layer of a blend of a vinyl chloride polymer and chlorinated polyethylene and a second layer comprising a normally solid thermoplastic adhesive. Improved performance is obtained when the first layer additionally comprises an interpolymer of ethylene and at least one carboxylic acid or ester thereof containing ethylenic unsaturation.

10 Claims, 1 Drawing Figure

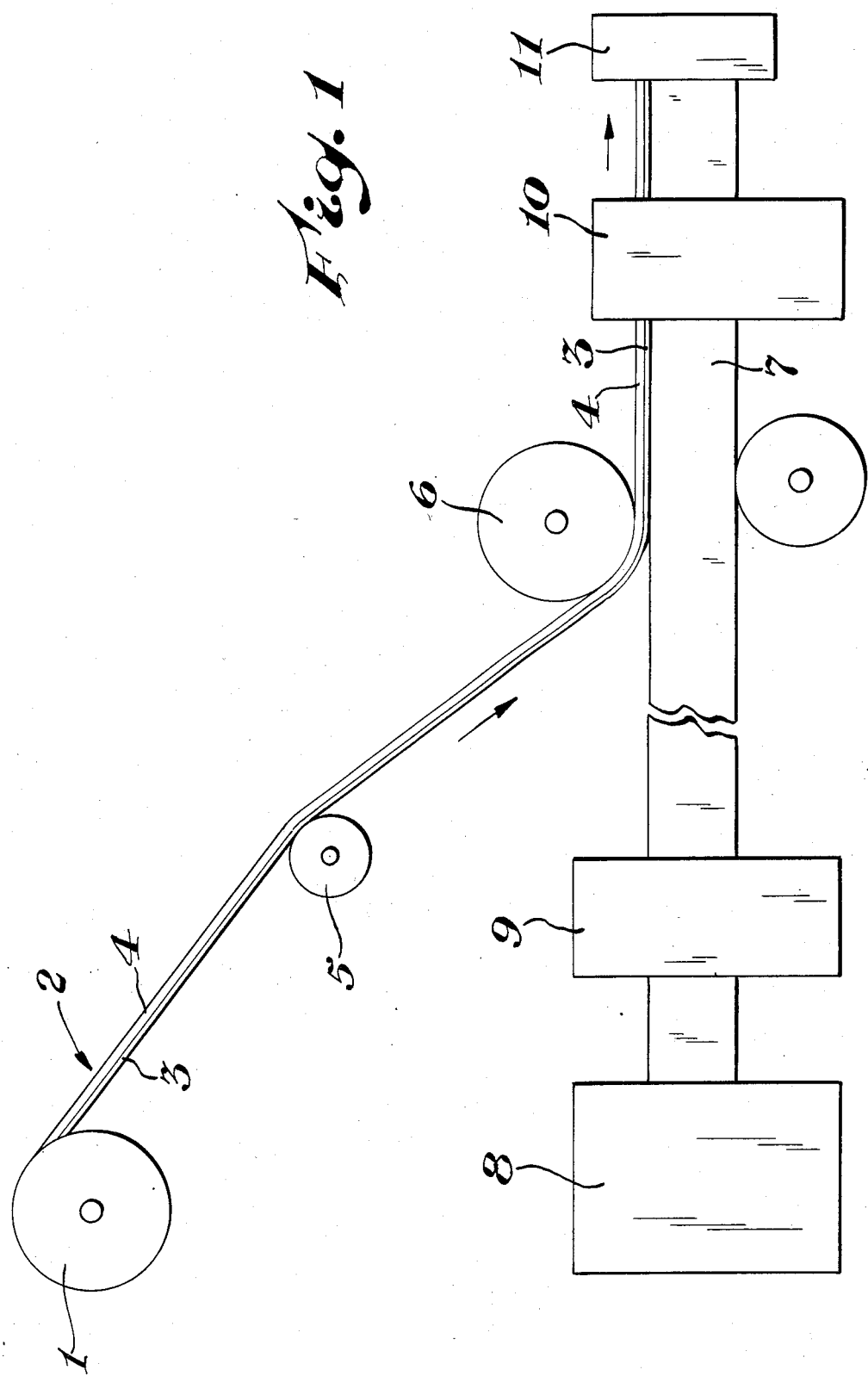

WEATHERABLE COEXTRUDED FLEXIBLE FILMS AND LAMINATED STRUCTURE

BACKGROUND OF THE INVENTION

The present invention relates to weatherable films. More particularly, the present invention relates to a blend of polymers having exceptional stability to ultraviolet light degradation. The novel compositions of the invention are especially well suited for use as extruded films. Such extruded films may be employed as weatherable surface coatings to numerous substrates, especially steel in the form of sheets or other shapes for use in building panels or other architectural applications.

Accordingly in one embodiment of the present invention, there is provided a film structure comprising an adhesive layer and a weatherable layer wherein the weatherable layer comprises the above polymer blend. In another embodiment of the invention there is provided a unique laminated structure comprising a terblend of polymers having exceptional weather resistance as well as compatibility with an optionally applied adhesive layer.

It is previously known in the art to employ chlorinated polyolefins in applications requiring weatherable surfaces such as in flashing and like architectural type materials. In U.S. Pat. No. 3,705,067 a flashing material comprising one or more film layers of an essentially non-plasticized thermoplastic sheet of solid chlorinated olefin polymer and an inherently porous woven reinforcing fiber mat is disclosed. No adhesive layer is provided. Contact between the fiber layer and the chlorinated olefin layer is obtained by application of heat and pressure. Blends of polyvinyl chloride and chlorinated polyethylene or other chlorinated polyolefins are also previously known. In U.S. Pat. No. 3,165,560, blends of polymers of vinyl chloride including copolymers thereof and chlorinated polyolefins are disclosed having improved impact strength. Foils and thin plates of such blends are further disclosed. Additional teachings of blends of polyvinyl chloride polymers or copolymers and chlorinated polyolefins especially chlorinated polyethylene are found in U.S. Pat. Nos. 3,006,889; 3,291,863; 3,299,182; 3,904,579; 3,940,456; 3,994,995 and 4,113,805. The teachings of all of the above identified patents are herein incorporated by reference.

In U.S. Pat. No. 3,845,166 there is provided a curable composition for wire insulation containing a chlorinated polyolefin, polyvinyl chloride, an ethylene polymer such as ethylene vinyl acetate and a curing agent.

While previously known blends have been usefully employed to prepare moldings and extruded objects, a coextruded film structure having an adhesive layer and a weather resistant layer of such blends is believed to be previously unknown.

It would be desirable to provide a coextruded film which is readily adherable to metal or other structural substrates having improved weathering characteristics. In particular, it would be desirable to provide a thin extruded film having properties suitable for use as a coating to a metal substrate.

SUMMARY OF THE INVENTION

According to the present invention there is now provided a coextruded flexible film having a first layer comprising a blend of a vinyl chloride polymer and a chlorinated polyolefin and a second layer comprising a normally solid thermoplastic adhesive. Preferably, in the coextruded flexible film the first layer additionally comprises an interpolymer of ethylene and at least one carboxylic acid or ester thereof containing ethylenic unsaturation. Most preferably, the normally solid thermoplastic adhesive comprises a blend of (1) an interpolymer of ethylene and at least one ethylenically unsaturated carboxylic acid, and (2) an interpolymer of ethylene and at least one ethylenically unsaturated carboxylic acid ester.

In another embodiment of the present invention there is provided a structure comprising a substrate, preferably an iron containing substrate such as sheet steel having adhered thereto a coextruded flexible film of the above description.

DETAILED DESCRIPTION OF THE INVENTION

In the present coextruded film composition, the first layer comprising the previously described polymeric blend exhibits long term weather resistance, ultraviolet light stability, hardness, scratch resistance, and an ability to be colored by the use of readily available colorants. Vinyl chloride polymers for use in such first layer include polyvinyl chloride as well as polymers of vinyl chloride and at least one comonomer having up to about 10 carbons. Suitable comonomers include olefins, vinyl esters as well as alkyl esters of unsaturated carboxylic acids. Preferred comonomers include vinyl acetate, methyl acrylate or methyl methacrylate. The amount of any such comonomers employed may be up to about 25 percent by weight, preferably no more than about 10 percent by weight. A preferred vinyl chloride polymer is polyvinyl chloride. Additives such as stabilizers, lubricants, etc. may be present if desired. Suitably, the vinyl chloride polymer has an inherent viscosity of from about 0.6 to about 1.0 measured by ASTM Method Number D-1243. A preferred range is from about 0.65 to about 0.8.

Chlorinated polyolefins usefully employed in the blend comprising the first layer include solid particulated polyolefins chlorinated according to known techniques. Preferred chlorinated polyolefins are chlorinated polyethylenes especially such polyethylenes such as low pressure polyethylene having been chlorinated at elevated temperatures above about 90° C. Suitable chlorinated polyethylenes and processes for their manufacture are more particularly described in the previously cited references, the teachings of which have already been incorporated herein by reference thereto. The chlorinated polyolefin resin suitably has a melt viscosity of from about 6,000 to about 30,000 poise measured according to Dow published Method CPE D-3a. A preferred viscosity is from about 7,500 to about 25,000. The chlorine content of the chlorinated polyolefin resin is suitably from about 25 to about 42 percent by weight, preferably from about 30 to about 40 percent by weight. Additional additives may also be present in the chlorinated polyolefin if desired. Examples include silicic acid and a siloxane oil as disclosed in U.S. Pat. No. 3,940,456, stabilizers, processing aids, etc.

In the blend, the weight proportions of vinyl chloride polymers to chlorinated polyolefin may vary from about 5:95 to about 80:20. A preferred proportion is from about 10:90 to about 75:25.

As previously stated, preferably there is provided in addition to the previously described vinyl chloride polymer and chlorinated polyolefin, an interpolymer of ethylene and at least one carboxylic acid or ester thereof containing ethylenic unsaturation. Especially preferred is a copolymer of ethylene and vinyl acetate. In the terblend the interpolymer of ethylene and at least one carboxylic acid or ester thereof containing ethylenic unsaturation is suitably added to the previously described blend of vinyl chloride polymer and chlorinated polyolefin in an amount up to about 30 percent, preferably up to about 15 percent based on total terblend weight. The interpolymer of ethylene and at least one carboxylic acid ester containing ethylenic unsaturation suitably has a melt index from about 0.8 to about 10 measured under ASTM D-1238 Condition E and preferably 1.0 to about 8. The percent ethylene in such interpolymer is suitably from about 95 to about 60 percent, from about 90 to about 70 percent, based on total interpolymer weight.

Additional components may also be present in the weatherable composition according to the present invention. Most notably, however, plasticizing additives such as mineral oil, etc. need not be present or their amounts may be greatly reduced due to the plasticizing effect of the chlorinated polyolefin component. However, suitable additives which may be included are thermal stabilizers, process aids, pigments, colorants, fire retardants, antioxidants, fillers, etc. Suitable thermal stabilizers include metal or mixed metal compounds such as barium, cadmium, zinc, calcium, sodium or lead salts of carboxylic acids especially long chain fatty acids (maleates, stearates, laurates, etc.), phosphorous containing compositions, epoxy resins, and epoxidized vegetable oils, IRGANOX®1076, etc. Processing aids include low molecular weight polyethylene wax compositions oxidized polyethylene wax, ester wax, etc. Such processing aids may be used in combination with a coupling agent according to known techniques if desired. Suitable pigments employed according to the present invention include well-known additives such as titanium dioxide. Fillers may be added in place of or in addition to pigments if desired. Suitable compatible fillers include talc, mica, calcium carbonate, clay, aluminum trihydrate, glass microspheres, etc. An ignition inhibiting agent may additionally be employed where desired in order to improve the ignition resistance of the present compositions. Suitable ignition inhibitors include the well-known brominated aromatic compounds as well as phosphorous or antimony contained compounds or mixtures thereof. Antioxidants are suitably of the hindered phenyl type such as butylated hydroxy toluene, tetratertiary butyl dihydroxy biphenyl, etc.

Preferably, such additives collectively are added so as to comprise no more than about 75 percent by weight of the resulting composition. It has been discovered that at least some titanium dioxide i.e. 10-25 percent by weight, is desired to provide the most desirable ultraviolet light, resistance.

Previously known conventional compounding systems may be employed in the preparation of compositions of the invention. Examples of suitable equipment include Banbury mixers, roll mills, continuous mixer/extruders, twin screw compounding extruders, etc. In the process, the various resins in their respective proportions are added in the form of pellets, or other suitable form along with additional desired additives. The mixtures is then thoroughly mixed by use of one of the aforementioned compounding systems until a homogeneous melt is obtained. The melt may then be coextruded with an adhesive polymer to form the coextruded film laminate comprising one embodiment of the present invention. Suitable equipment for the mixing and extruding operations includes equipment for use with chlorine containing polymers which are well designed to prevent polymer degradation. While the novel terblend of the invention may be extruded into a film according to well-known techniques as previously described, the composition need not be limited to such uses. However, the presence of the interpolymer of ethylene and at least one carboxylic acid ester containing ethylenic unsaturation is believed to contribute to improved compatibility of the film to the normally solid thermoplastic adhesive.

The adhesive layer of the present invention is coextensive with the first layer and tightly bonded thereto as a result of the well-known coextrusion process. By the term tightly bonded is meant that the adhesion obtained between the two layers is at least as great as that of either polymer's own internal cohesive strength.

Suitable normally solid thermoplastic adhesives include chlorinated polyethylene and interpolymers of an olefin, especially ethylene, and at least one comonomer selected from the group consisting of carboxylic acids and esters thereof having ethylenic unsaturation. Suitable examples of the latter class include copolymers or terpolymers of ethylene and up to about 30 percent by weight, preferably 5 to 25 percent by weight, of a copolymerizable monomer selected from the group consisting of vinyl acetate, acrylic acid, methyl methylacrylate, butyl acrylate, and mixtures thereof. Blends of such copolymers or interpolymers may also be employed. A preferred normally solid thermoplastic adhesive is a copolymer of ethylene and vinylacetate or a blend thereof with a copolymer of ethylene and acrylic acid. A suitable blend comprises from about 95 to about 70 percent by weight ethylene/vinyl acetate copolymer and the remainder comprises ethylene/acrylic acid copolymer. A particularly preferred ethylene/vinyl acetate copolymer is sold under the trademark Plexar 3062, available from Norchem Inc. A preferred ethylene/acrylic acid copolymer is Dow EAA 1410 containing 9 percent acrylic acid available from The Dow Chemical Company.

Suitably, the layers of a film prepared according to the present process are from about 0.01 mm to about 1 mm in thickness. Generally, the weather resistant first layer is thicker than the adhesive layer. Suitably, such first layer is about 2 to about 5 times thicker than the adhesive layer. By means of the coextruded adhesive layer, the coextruded film structure of the invention may be applied directly to substrates without the use of solvent based or other adhesives. The film is easily bonded to a hot metal surface employing presently available lamination equipment. A suitable lamination apparatus is more particularly described by reference to the figure.

In the apparatus there is provided a film roll unwind 1 for supply of the laminated weatherable film 2 having adhesive layer 3 and weatherable layer 4. The laminated weatherable film 2 is passed over a tensioning roller 5 and under a lamination nip roll 6 where it is contacted with a heated substrate 7 obtained from substrate supply 8. Heating of the substrate may be occasioned by use of heating means 9 which may be an oven, induction heater, hot rollers or other heating means. After lamination to the substrate the resulting laminate may be quenched either with or without an additional heating stage to obtain through adhesion in the post treatment stage 10 and recovered by coiling or other means in the recovery stage 11.

In the use of the present invention, the coextruded flexible film may be employed as a coating over a variety of suitable substrates. Included are metals such as aluminum, steel, galvanized steel, stainless steel, weatherable alloys such as Galvalume ®, and other suitable substrates such as plastics, fabrics, and cellulosic materials such as paper. In the preferred embodiment, the substrate is a metal, especially steel.

The substrates having adhered thereto the presently described coextruded flexible film may be used in a variety of applications including roof sheeting, corrugated roofing, standing seam roofing, building panels, siding, gutters, downspouts, facia and other architectural trim, storage vessels, containers, tanks, highway barriers, window and door frames, culverts, piping, pipe jacketing, equipment housing for air conditioners, ventilators, pumps and the like, and parts such as body panels, housings, etc. in vehicles including automobiles, trucks, etc.

Because the composition of the present invention may contain colorants and pigments or the separate layers of the coextruded flexible film may contain such additives no additional topcoating is necessary or required in the resulting structures. However, a coating of paint or other material may be applied if desired.

SPECIFIC EMBODIMENTS

Having described the invention, the following examples are provided to more particularly describe the present invention but are not to be construed as limiting.

EXAMPLE 1

A weather resistant blend of copolymers demonstrating good adhesive compatibility and weather resistance is prepared by combining the following ingredients in the indicated weight percentage based on total composition weight.

| Component | Amount (%) |
| --- | --- |
| polyvinyl chloride resin (GEON ® 86, available from B.F. Goodrich, Inc.) | 44.68 |
| chlorinated polyethylene (CPE 3611 available from The Dow Chemical Company) | 18.62 |
| ethylene vinylacetate copolymer (EVA 3190 available from E.I. DuPont deNemours) | 11.17 |
| TiO$_2$ (DuPont R-960) | 14.89 |
| CaCO$_3$ (CS-11 available from Georgia Marble, Inc.) | 3.72 |
| Calcium Stearate | 0.60 |
| Polyethylene wax (6A available from Allied Chemical) | 0.74 |
| Plaschek 775 ESO (available from Ferro Corp.) | 2.23 |
| THERMCHEK ® 1827 | 2.23 |
| THERMCHEK ® 904 | 0.74 |
| IRGANOX ® 1076 (available from Ciba-Geigy, Inc.) | 0.38 |

The terblend is prepared by first charging the polyvinyl chloride resin to a Henschel high intensity mixer and mixing for one minute. The processing aids and thermal stabilizers (but not pigments or additional resins) are added and mixing continued for several minutes until a temperature of about 80°-95° C. is obtained. The material is removed from the mixer and added to a Banbury mixer along with the additional components. The blend is fluxed for about five minutes until the temperature reaches about 160°-180° C. and transferred to a two roll mill, formed into sheets, cooled and cut into cubes.

The resulting material may be reheated and coextruded in an 80/20 weight ratio with an adhesive resin to form a two layer film. The adhesive layer comprises 90 percent by weight PLEXAR ®3062, available from Norchem Inc. and 10 percent PRIMACOR ®1410, available from The Dow Chemical Company. The coextruded film is .13 mm thick. The coextruded film is chilled and wound into a coil.

After edge trimming and slitting to width, the coextruded film is adhered to a thin steel sheet by a hot metal coating apparatus substantially according to the design illustrated in the Figure. The metal is heated to a temperature of about 200° C. and contacted with the adhesive film by means of the nip roller. The composite structure is then cooled by a water quench and coiled.

The composite metal/film structure may be easily formed by cold rolling, stamping or other suitable process. Double sided lamination may be achieved by simultaneously or sequentially coating both surfaces of the substrate with the coextruded flexible film.

What is claimed is:

1. A coextruded flexible film particularly adapted for use as a weatherable surface coating by lamination to a substrate having a first layer comprising a blend of a vinyl chloride polymer, an interpolymer comprising ethylene and at least one carboxylic acid or ester thereof containing ethylenic unsaturation, and a chlorinated polyolefin and a second layer comprising a normally solid thermoplastic adhesive comprising an interpolymer of an olefin and at least one copolymerizable comonomer selected from the group consisting of carboxylic acids and esters thereof having ethylenic unsaturation.

2. A film according to claim 1 wherein the vinyl chloride polymer is selected from the group consisting of polyvinyl chloride and polymers of vinyl chloride and at least one comonomer having up to about 10 carbons selected from the group consisting of olefins, vinyl esters and alkyl esters of unsaturated carboxylic acids.

3. A film according to claim 2 wherein the vinyl chloride polymer has an inherent viscosity of from about 0.6 to about 1.0.

4. A film according to claim 1 wherein the chlorinated polyolefin is chlorinated polyethylene.

5. A film according to claim 4 wherein the chlorinated polyethylene resin has a viscosity of from about 6,000 to about 30,000 poise.

6. A film according to claim 1 wherein the interpolymer of ethylene and at least one carboxylic acid or ester therof containing ethylenic unsaturation is an ethylene/vinyl acetate copolymer.

7. A laminated structure comprising a substrate having adhered thereto a coextruded flexible film according to claim 1.

8. A laminated structure according to claim 7 wherein the substrate comprises sheet steel.

9. A film according to claim 1, wherein the adhesive comprises a copolymer of ethylene and up to 30 percent by weight of vinyl acetate, acrylic acid, methyl methacrylate, butyl acrylate and mixtures thereof.

10. A film according to claim 1 wherein the adhesive comprises a blend of from 95 to 70 percent by weight of a copolymer of ethylene and vinyl acetate and from about 5 to about 30 percent by weight of a copolymr of ethylene and acrylic acid.

* * * * *